United States Patent
Kaneko

(10) Patent No.: US 10,963,991 B2
(45) Date of Patent: Mar. 30, 2021

(54) INFORMATION PROCESSING DEVICE, INFORMATION PROCESSING METHOD, AND RECORDING MEDIUM

(71) Applicant: NEC Corporation, Tokyo (JP)

(72) Inventor: Eiji Kaneko, Tokyo (JP)

(73) Assignee: NEC Corporation, Tokyo (JP)

( * ) Notice: Subject to any disclaimer, the term of this patent is extended or adjusted under 35 U.S.C. 154(b) by 51 days.

(21) Appl. No.: 16/316,903

(22) PCT Filed: Jul. 18, 2017

(86) PCT No.: PCT/JP2017/025854
§ 371 (c)(1),
(2) Date: Jan. 10, 2019

(87) PCT Pub. No.: WO2018/021079
PCT Pub. Date: Feb. 1, 2018

(65) Prior Publication Data
US 2019/0251665 A1    Aug. 15, 2019

(30) Foreign Application Priority Data
Jul. 25, 2016   (JP) .............................. JP2016-145056

(51) Int. Cl.
*G06T 5/00*         (2006.01)
*G06T 5/50*         (2006.01)
(Continued)

(52) U.S. Cl.
CPC ................ *G06T 5/001* (2013.01); *G01J 3/36* (2013.01); *G06T 3/4038* (2013.01);
(Continued)

(58) Field of Classification Search
None
See application file for complete search history.

(56) References Cited

U.S. PATENT DOCUMENTS 6,052,156 A *   4/2000   Mukai ...................... H04N 9/65
                                                      341/144
8,811,764 B1 *  8/2014   Hsu ........................... G06T 3/40
                                                      382/260
(Continued)

FOREIGN PATENT DOCUMENTS

JP     2001-143054 A    5/2001
JP     2010-218434 A    9/2010
(Continued)

OTHER PUBLICATIONS

Amarsaikhan, D.—"Fusing high-resolution SAR and optical imagery for improved urban land cover study and classification"—International Journal of Image and Data Fusion—Mar. 2010—pp. 83-97 (Year: 2010).*
(Continued)

*Primary Examiner* — Bernard Krasnic
(74) *Attorney, Agent, or Firm* — Finnegan, Henderson, Farabow, Garrett & Dunner, L.L.P.

(57) ABSTRACT

An information processing device according to the present invention includes a memory; and at least one processor coupled to the memory. The processor performing operations. The operations includes: receiving first multiple-images; and generating, based on a first image in the first multiple-images, a third image relating to a second image in a second wavelength band different from a first wavelength band of the first image.

4 Claims, 7 Drawing Sheets

(51) Int. Cl.
*G01J 3/36* (2006.01)
*G06T 3/40* (2006.01)

(52) U.S. Cl.
CPC ............ *G06T 3/4061* (2013.01); *G06T 5/005* (2013.01); *G06T 5/50* (2013.01); *G06T 2207/10036* (2013.01); *G06T 2207/20221* (2013.01)

(56) References Cited

U.S. PATENT DOCUMENTS

| | | | | |
|---|---|---|---|---|
| 2005/0243312 | A1* | 11/2005 | Geshwind | G01J 3/10 356/310 |
| 2009/0318815 | A1* | 12/2009 | Barnes | A61B 5/0064 600/473 |
| 2011/0037997 | A1* | 2/2011 | Karszes | G06T 7/30 358/1.15 |
| 2013/0222696 | A1* | 8/2013 | Yamazaki | G06K 9/00536 348/571 |
| 2017/0319075 | A1* | 11/2017 | Homan | A61B 5/0035 |

FOREIGN PATENT DOCUMENTS

| | | |
|---|---|---|
| JP | 2013-092884 A | 5/2013 |
| WO | WO 2013/145201 A1 | 10/2013 |

OTHER PUBLICATIONS

Li, M.—"Automated Production of Cloud-Free and Cloud Shadow-Free Image Mosaics from Cloudy Satellite Imagery"—2004 pp. 1-5 (Year: 2004).*

International Search Report dated Oct. 17, 2017, in corresponding PCT International Application.

Extended European Search Report of the counterpart European Patent Application No. 17 83 4087 dated Jul. 16, 2019.

Galatsanos et al.; "Digital Restoration of Multichannel Images" IEEE Transactions on Acoustics, Speech, and Signal Processing, vol. 37, No. 3, pp. 415-421, (Mar. 1989).

Tseng et al.; "Automatic Cloud Removal from Multi-Temporal SPOT Images", Applied Mathematics and Computation, vol. 205, pp. 584-600. (Nov. 2008).

Cerra et al.; "Cloud Removal in Image Time Series Through Unmixing", IEEE, pp. 1-4, (Jul. 2015).

* cited by examiner

INFORMATION PROCESSING DEVICE, INFORMATION PROCESSING METHOD, AND RECORDING MEDIUM

CROSS-REFERENCE TO RELATED PATENT APPLICATIONS

This application is a National Stage Entry of International Application No. PCT/JP2017/025854, filed Jul. 18, 2017, which claims priority from Japanese Patent Application No. 2016-145056, filed Jul. 25, 2016. The entire contents of the above-referenced applications are expressly incorporated herein by reference.

TECHNICAL FIELD

The present invention relates to processing of information, and in particular, relates to an information processing device, an information processing method, and a recording medium which process an image.

BACKGROUND ART

A technique for observing an earth's surface on a high altitude by using an observation device such as an artificial satellite or an aircraft is generally referred to as "remote sensing". Remote sensing often observes an intensity of an electromagnetic wave such as light emitted from an area of a predetermined range on an earth's surface. In a method for storing an observation result acquired by using remote sensing, observation values are often stored as pixel values in an image. In other words, each of pixel values in an observation image relates to an intensity of an electromagnetic wave along arrangement of a thing on an earth's surface of an observed area.

When, for example, an observation device is an image sensor, an observation result is acquired as an image from the image sensor. A pixel value included in the image is a value of an intensity of observation light emitted, from a target object, in an incident direction of a light reception element of the image sensor.

Note that, when a pixel value is a value indicating brightness of observation light, the pixel value is a "luminance value".

In observation using an image sensor, it is often the case that light in a wavelength included in a wavelength band of a specific range is selectively used. Therefore, image sensing uses a filter that transmits light of the wavelength band of the specific range.

Further, remote sensing may use light in a plurality of wavelength bands. The reason is that a thing to be observed reflects, according to a material and a state of a surface thereof, light having different intensities in different wavelength bands. In this case, remote sensing observes intensities of light in a plurality of wavelength bands by using a plurality of filters having different wavelength bands of transmitted light.

An application using information of a ground object being acquired from an image taken by such remote sensing is expected. The application is, for example, an application for generating a map, an application for grasping a land use state, an application for grasping a disaster situation, an application for acquiring a growth situation of an agricultural crop, or an application for identifying a mineral.

However, a ground object may be covered with a thing (or moving object) such as a cloud, a mist, a fog, a bird, or a flying object. Therefore, in an image acquired by an observation light reflected on an earth's surface, there is a case in which an image of a partial area cannot be acquired. In other words, in remote sensing, an image of a partial area may be deficient.

Therefore, a technique for restoring a deficiency is proposed (see, for example, PTL 1). An image processing device described in PTL 1 restores an area covered with a cloud in an input image by using a reference image of another date and time in which there is no cloud in the same area. The image processing device described in PTL 1 reads an input image and measurement environment information. Then, the image processing device described in PTL 1 determines an area (deficient area) covered with a cloud in the input image. Then, the image processing device described in PTL 1 acquires, based on the measurement environment information, a reference image having been observed at a solar position similar to the input image and including information of an earth's surface equivalent to the deficient area. Then, the image processing device described in PTL 1 replaces a pixel value of the deficient area of the input image with a pixel value of an area equivalent to the deficient area in the reference image. In this manner, the image processing device described in PTL 1 restores an image of a deficient area in an input image.

The technique described in PTL 1 will be described with reference to the drawings.

FIG. 7 is a block diagram schematically illustrating a configuration of functions of an image processing device 7 described in PTL 1.

The image processing device 7 is connected to an image supply device 78 and an output device 79.

The image supply device 78 supplies au observation image 111 and measurement environment information 710 to the image processing device 7.

The image processing device 7 includes an image reception unit 71, a similar environment image acquisition unit 72, a deficient area restoration unit 75, and an image storage unit 76.

The image storage unit 76 previously stores images (reference images 720) observed at various dates and times and under various environments.

The image reception unit 71 receives the observation image 111 and the measurement environment information 710 from the image supply device 78.

The similar environment image acquisition unit 72 determines an area covered with a cloud as a deficient area 150 in the observation image 111. Further, the similar environment image acquisition unit 72 acquires, from the image storage unit 76, the reference image 720 including an image (e.g. information of a ground object of the deficient area 150) having been observed at a solar position similar to the observation image 111 and being equivalent to the deficient area 150, based on the measurement environment information 710.

Based on the observation image 111, the reference image 720, and the deficient area 150, the deficient area restoration unit 75 replaces the deficient area 150 in the observation image 111 with an image of a relating area in the reference image 720 and generates a restoration image 740. The deficient area restoration unit 75 then transmits the restoration image 740 to the output device 79.

The output device 79 outputs the restoration image 740. The output device 79, for example, displays the restoration image 740.

CITATION LIST

Patent Literature

[PTL 1] Japanese Unexamined Patent Application Publication 2010-218434

SUMMARY OF INVENTION

Technical Problem

As described above, the invention described in PTL 1 replaces the deficient area 150 in the observation image 111 with information (an image) of the reference image 720 observed in another date and time.

When a state (e.g. a state of a ground object) of the deficient area 150 in the observation image 111 is similar to when the reference image 720 has been observed, the invention described in PTL 1 is able to generate the restoration image 740 relating to the observation image 111.

It is assumed that the observation image 111 is an image in which a ground is observed. In this case, for example, with regard to a moving object such as a person and an automobile, a position, a number, and a distribution state thereof in an image change with an elapse of time. Alternatively, with regard to vegetation, a state (e.g. a propagation state or a dead state) changes according to a change of a time zone or a season. Alternatively, with regard to a building, a construction state expansion or reconstruction) changes. In other words, a ground state changes with an elapse of time.

Therefore, when a date and time in which the observation image 111 has been observed departs from a date and time in which the reference image 720 has been observed, a state in the deficient area 150 changes from the state where the reference image 720 has been observed. As a result, the invention described in PTL 1 becomes unable to generate an appropriate restoration image 740 even by using the reference image 720.

In this manner, in the invention described in PTL 1, there is an issue that it becomes difficult to generate an appropriate restoration image 740 even by using the reference image 720.

In order to solve the above-described issue and generate the appropriate restoration image 740, the image processing device 7 needs to use the reference image 720 similar to the observation image 111 in an observation date and time, in addition to an observation area and a solar position. However, in order to store the reference image 720 that satisfies this condition in the image storage unit 76, it is necessary to collect reference images 720 in all areas and dates and times where restoration is anticipated. However, it is practically difficult to collect reference images 720 relating to all areas and dates and times.

In this manner, in the invention described in PTL 1, there is an issue that only the restoration image 740 of the observation image 111 in a date and time similar to a stored reference image 720 can be generated.

Further, it is assumed that a satellite image acquired by observing a ground by an orbiting satellite is restored. In this case, in order to restore a satellite image, the observation image 111 to be restored and the reference image 720 being similar in both a solar position and an observation area are needed. In other words, the reference image 720 for restoring a satellite image needs to be similar to the observation image 111 in observation conditions such as an observation area, a solar position, and an observation time. Therefore, when restoring a satellite image, it becomes more difficult to acquire the reference image 720 necessary for restoration.

An object of the present invention is to provide an information processing device, an information processing method, and a recording medium that solve the above-described issue and generate an image for restoring an observation image without using the reference image 720.

Solution to Problem

An information processing device according to one aspect of the present invention includes:
 a memory; and
 at least one processor coupled to the memory,
 the processor performing operations. The operations includes:
 receiving first multiple-images; and
 generating, based on a first image in the first multiple-images, a third image relating to a second image in a second wavelength band different from a first wavelength band of the first image.

An information processing method according to one aspect of the present invention includes:
 receiving first multiple-images; and
 generating, based on a first image in the first multiple-images, a third image relating to a second image in a second wavelength band different from a first wavelength band of the first image.

A recording medium according to one aspect of the present invention computer-readable embodies a program. The program causes a computer to perform a method. The method includes:
 receiving first multiple-images; and
 generating, based on a first image in the first multiple-images, a third image relating to a second image in a second wavelength band different from a first wavelength band of the first image.

Advantageous Effects of Invention

According to the present invention, an advantageous effect of generating an image for restoring an observation image without using the reference image 720 is achievable.

EXAMPLE EMBODIMENT

Figure 1:
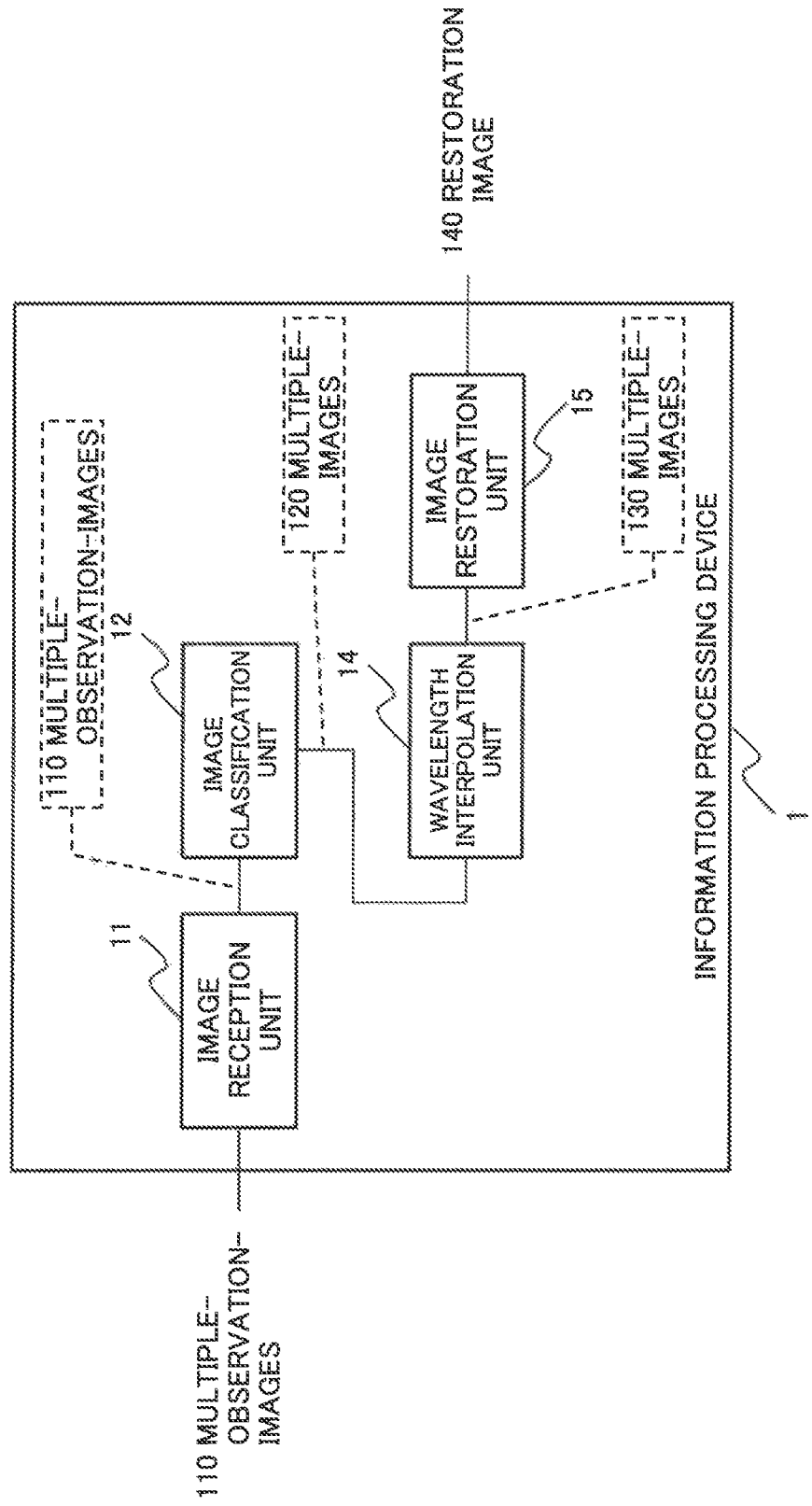
FIG. 1 is a block diagram illustrating one example of a configuration of an information processing device according to a first example embodiment of the present invention.

Next, example embodiments of the present invention will be described with reference to the drawings.

The drawings are respectively used to describe the example embodiments of the present invention. However, the present invention is not limited to illustration of the drawings. Further, similar components of drawings are assigned with the same number, and repetitive description thereof may be omitted. Further, in the drawings used for the following description, description for a configuration of a portion unrelated to description of the example embodiments may be omitted and such a configuration may not be illustrated.

First Example Embodiment

Next, a first example embodiment of the present invention will be described with reference to the drawings.

Description of an Example of an Applied System

First, in order to assist understanding of an information processing device 1 according to the first example embodiment, one example of an information processing system 3 using the information processing device 1 will be described.

Figure 2:
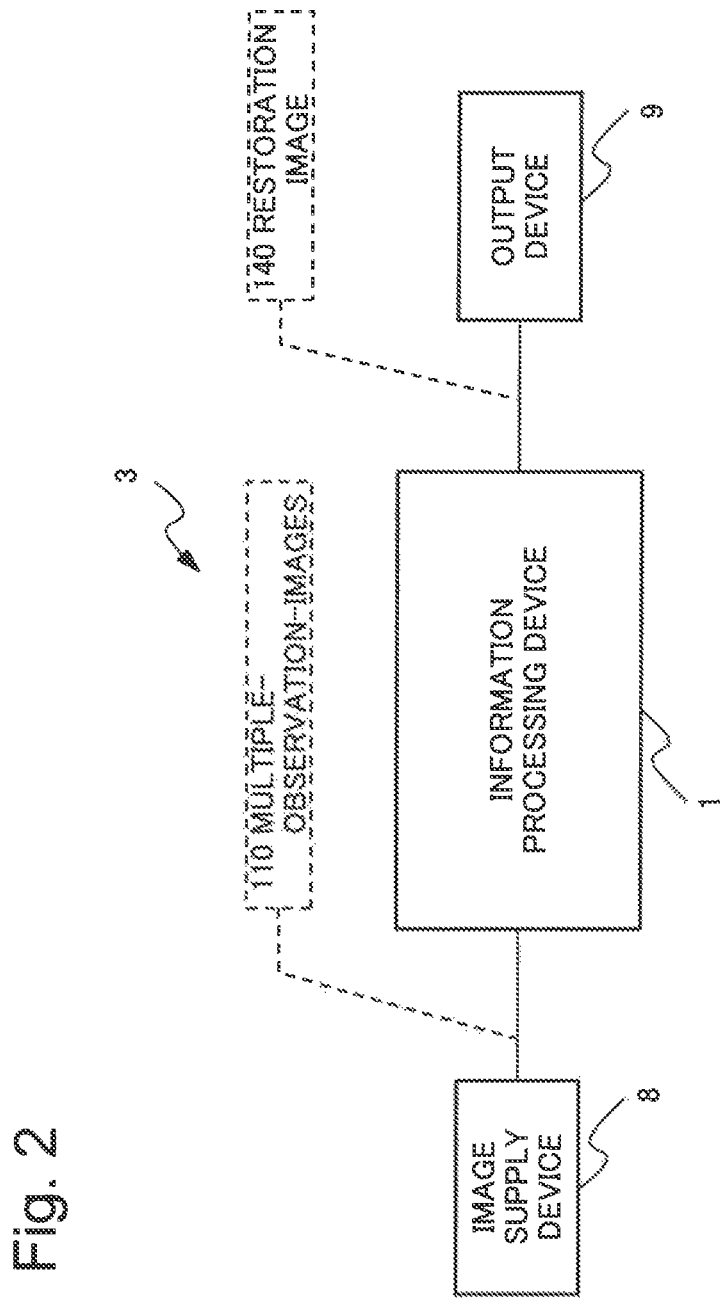
FIG. 2 is a block diagram illustrating one example of a configuration of an information processing system including the information processing device according to the first example embodiment of the present invention.

FIG. 2 is a block diagram illustrating one example of a configuration of the information processing system 3 including the information processing device 1 according to the first example embodiment of the present invention.

As illustrated in FIG. 2, the information processing system 3 includes the information processing device 1 according to the first example embodiment, an image supply device 8, and an output device 9.

The information processing device 1 will be described in detail later.

The image supply device 8 supplies an observation image group multiple-observation-images) 110 including a plurality of observation images to the information processing device 1. The image supply device 8 may provide another information, in addition to the multiple-observation-images 110. The image supply device 8 may supply, for example, an observation time of an observation image to be described later. Note that the image supply device 8 may supply observation images included in the multiple-observation-images 110 at once or via division into a plurality of times.

As long as the image supply device 8 provides the multiple-observation-images 110, a detailed configuration and the like thereof is not specifically limited.

The image supply device 8 is, for example, a capturing device that observes an intensity of an electromagnetic wave reflected by an observation object in a plurality of wavelength bands and outputs an observed result as the multiple-observation-images 110. Alternatively, the image supply device 8 is a device that stores the multiple-observation-images 110 that is a result acquired by observation of the above-mentioned capturing device. In other words, the image supply device 8 is a storage device such as a hard disk, a server device, or the like.

Alternatively, the image supply device 8 is, for example, an observation device which is mounted on an aircraft or an artificial satellite and which acquires the multiple-observation-images 110 that includes images of reflected light which is reflected on an earth's surface in a plurality of wavelength bands.

Alternatively, the image supply device 8 is, for example, a camera that captures an image through a plurality of bandpass filters. In other words, the image supply device 8 is a device which captures, in a plurality of wavelength bands, an observation image by using a bandpass filter which transmits observation light in each wavelength band.

When the multiple-observation-images 110 includes observation images of a plurality of wavelength bands, the number of wavelength bands is designated as "N (N is an integer equal to or more than 2)" in the following description.

Note that widths of all wavelength bands may accord with each other, or widths of at least some wavelength bands may be different from widths of other wavelength bands.

The image supply device 8 may supply, in addition to the multiple-observation-images 110, information relating to a wavelength band (e.g. a "center wavelength", a "band width", an "upper-limit wavelength" and/or a "lower-limit wavelength" of a wavelength band) to the information processing device 1.

In this manner, the multiple-observation-images 110 is a set of observation images (e.g. images of a distribution of brightness in an observation object) relating to an observation object with respect to a plurality of wavelength bands. Note that, in an observation image, a luminance value of each pixel is an intensity of observation light reached from a direction according to the pixel.

The multiple-observation-images 110 may include, for example, observation images of a plurality of wavelength bands acquired from an observation object at the same observation time. In this case, the multiple-observation-images 110 is a result acquired by observing, by the image supply device 8, an observation object at the same time with respect to a plurality of wavelength bands. Specifically, the multiple-observation-images 110 is a set of observation images observed based on a series of operations in a measurement instrument such as a camera with respect to a plurality of wavelength bands. In this case, a plurality of observation images may be managed in association with an observation object as one cluster of the-multiple-observation images 110.

Alternatively, the multiple-observation-images 110 may include observation images observed at a plurality of times. It is assumed that the multiple-observation-images 110 includes, for example, eight observation images with respect to eight different wavelength bands. In this case, four observation images of the eight observation images may be images observed at a certain time $T_1$ and four other observation images may be images observed at a time $T_2$ different from the time $T_1$. Further, the multiple-observation-images 110 may include observation images at three or more times without limitation to two times.

At least one observation image of observation images included in the multiple-observation-images 110 includes a deficiency.

When, for example, an observation image is an image of a ground captured from a satellite, in a partial area of any ground portion of the observation image, an area that does not include information of a ground object may occur by being covered with a thing. Such an area is hereinafter referred to as a "deficient area". The thing in this case is, for example, a cloud, a fog, a mist, an aircraft, or an automobile.

However, it is assumed that the thing is a moving object, as described above. Therefore, the multiple-observationimages 110 includes, other than an observation image including a deficient area, at least one observation image that does not include a deficiency in an area to which the deficient area relates. Note that, when an observation image is the ground image from a satellite, an observation image that does not include a deficiency refers to an image including information of a ground portion relating to an area that is a deficient area.

However, the image supply device 8 is not limited to a device that observes an earth's surface from the sky. For example, the image supply device 8 may be a device that captures, from an earth's surface or near an earth' surface, the multiple-observation-images 110 on a distant earth's surface.

The output device 9 is a device that outputs a restoration image 140 generated by the information processing device 1. The output device 9 is, for example, a display device or a printer.

Note that the output device 9 may execute processing other than outputting. For example, the output device 9 may extract, from the restoration image 140, information relating to a material or a state of a captured object included in the restoration image 140.

However, the image supply device 8 and the output device 9 in the description above each are one example of a device connected to the information processing device 1. The information processing device 1 may be connected to a device different from the image supply device 8 and/or the output device 9.

DESCRIPTION OF CONFIGURATION

Next, the information processing device 1 is described with reference to the drawings. The information processing device 1 restores a deficient area in an observation image. Specifically, the information processing device 1 restores, based on at least one observation image, a deficient area of another observation image.

In the following description, for a case in which discriminating between an observation image that is a base of an image to be generated and an observation image that is a restoration target and is restored, the observation image that is a base is referred to as a "first observation image". Further, the observation image to be restored (an observation image including a deficient area) is referred to as a "second observation image". Further, contents (e.g. wavelength bands) relating to each observation image are described also by assigning "first" and "second" in a similar manner, as appropriate.

For example, a wavelength band of a first observation image is a "first wavelength band".

Note that a wavelength band (a first wavelength band) of a first observation image is different from a wavelength band (a second wavelength band) of a second observation image.

Details of a configuration of the information processing device 1 will be described.

FIG. 1 is a block diagram illustrating one example of the configuration of the information processing device 1 according to the first example embodiment of the present invention.

The information processing device 1 includes an image reception unit 11, an image classification unit 12, a wavelength interpolation unit 14, and an image restoration unit 15.

Outline of a Hardware Configuration

First, an outline of hardware of each component is described.

In order to achieve an operation to be described later, the image reception unit 11 includes a circuit for receiving the multiple-observation-images 110 from a device (e.g. the image supply device 8) that transmits the multiple-observation-images 110. However, when the image reception unit 11 acquires the multiple-observation-images 110 from a storage device, not illustrated, included in the information processing device 1, the image reception unit 11 may not include a circuit for receiving the multiple-observation-images 110.

Further, the image reception unit 11 achieves an operation to be described later, by using a circuit that controls a reception operation of the multiple-observation-images 110 or a processor that operates based on a predetermined program. Further, the image reception unit 11 may include a storage device (e.g., a magnetic disk device or a semiconductor memory such as a solid state drive (SSD)) that stores the multiple-observation-images 110 received.

The image classification unit 12 and the wavelength interpolation unit 14 achieve an operation to be described later, by using an electronic circuit or a processor that operates based on a program.

The image restoration unit 15 achieves an operation to be described later, by using an electronic circuit or a processor that operates based on a program. Further, the image restoration unit 15 includes a circuit for transmitting the generated restoration image 140 to a predetermined device (e.g. the output device 9). However, when the image restoration unit 15 stores the restoration image 140 on a storage device, not illustrated, included in the information processing device 1, the image restoration unit 15 may not include a circuit for transmitting the restoration image 140.

A hardware configuration will be described in detail later.

Description of Components

The image reception unit 11 receives the multiple-observation-images 110 (first multiple-images or a first image group).

However, the information processing device 1 may process the multiple-observation-images 110 stored on a storage device, not illustrated, included in the information processing device 1. In this case, the image reception unit 11 acquires the multiple-observation-images 110 from the storage device.

Observation images included in the multiple-observation-images 110 include information relating to wavelength bands, respectively. Further, the observation images respectively relate to different wavelength bands.

Note that, when a received observation image does not include information relating to a wavelength band, the image reception unit 11 associates the observation image with a wavelength band. In this operation, the image reception unit 11 may receive information relating to a wavelength band of an observation image from the image supply device 8 or the like.

A range of a wavelength band associated with an observation image is not specifically limited. Further, information indicating a wavelength band is not specifically limited. The information indicating a wavelength band may be, for example, a combination of an upper-limit wavelength and a lower-limit wavelength of a wavelength band. Alternatively, the information indicating a wavelength band may be a center wavelength of a wavelength band or a wavelength of a boundary of a band, and a band width. Note that, in the following description, when a wavelength of a wavelength band is described, description is made by using a center wavelength $\lambda$ of a wavelength band.

Note that, when a wavelength or a band is allocated with an identifier, the image reception unit 11 may use the identifier as information indicating a wavelength band.

Further, the image reception unit 11 may receive synchronization information, together with the multiple-observation-images 110.

The synchronization information refers to information used for determining synchronization of observation images in the image classification unit 12 to be described in detail later.

When, for example, the image classification unit 12 determines synchronization in observation times, synchronization information is an observation time of each observation image. Alternatively, when the image classification unit 12 determines synchronization in wavelength bands, synchronization information is information relating to a wavelength band.

Note that the image reception unit 11 may generate synchronization information, based on observation images. When, for example, the image classification unit 12 determines synchronization, based on a thing (e.g. a moving object) included in an observation image, the image reception unit 11 may generate synchronization information as information relating to the thing included in the observation image, by using predetermined image processing.

Note that the image classification unit 12 to be described later may generate synchronization information. In this case, the image reception unit 11 may not execute reception or generation of synchronization information.

The image classification unit 12 classifies observation images included in the multiple-observation-images 110, based on synchronization information, in such a way that synchronized observation images are included in the same cluster. The image classification unit 12 generates multiple-images (second multiple-images) including a cluster of the classified observation images.

In other words, the "cluster" is a set of one or multiple observation images synchronized. The multiple-images are a set of one or a plurality of "clusters".

Synchronization information used by the image classification unit 12 is not specifically limited.

The image classification unit 12 may make, for example, by using observation times of observation images, observation images in which observation times accord with each other as one cluster.

Note that a matter that "observation times accord with each other" is not limited to a case in which values of observation times are the same. For example, the image classification unit 12 may determine that observation images with observation times included in a predetermined time range have "accordance of observation times". The reason is that, when the multiple observation images are captured, a predetermined time is needed.

It is assumed that, for example, observation images are observation images in eight wavelength bands (N=8). A capturing time of observation images in second, third, fifth, and seventh wavelength bands is designated as $T_1$, and a capturing time of observation images in first, fourth, sixth, and eighth wavelength bands is designated as $T_2$. In this case, the image classification unit 12 generates multiple-images including two clusters that are a first cluster including second, third, fifth, and seventh observation images and a second cluster including first, fourth, sixth, and eighth observation images.

Alternatively, some wavelength bands may have high association (hereinafter, referred to as "synchronization in wavelength bands"). Therefore, the image classification unit 12 may make observation images in a plurality of synchronized wavelength bands as one cluster. In this case, the image classification unit 12 may classify observation images into clusters and generate multiple-images, by using information of a combination including synchronized wavelength bands as synchronization information.

It is assumed that, for example, the multiple-observation-images 110 includes eight observation images. In other words, the multiple-observation-images 110 includes eight wavelength bands (N=8). It is assumed that in the eight wavelength bands (N=8), second, third, fifth, and seventh wavelength bands are synchronized and first, fourth, sixth, and eighth wavelength bands are synchronized. In this case, the image classification unit 12 generates two clusters of a first cluster including observation images associated with the second, third, fifth, and seventh wavelength hands and a second cluster including observation images associated with the first, fourth, sixth, and eighth wavelength bands. Then the image classification unit 12 generates multiple-images including the generated two clusters.

In this case, synchronization information is information (e.g. identifiers of wavelength bands) capable of discriminating the second, third, fifth, and seventh wavelength bands and the first, fourth, sixth, and eighth wavelength bands.

Alternatively, the image classification unit 12 may classify observation images into clusters, based on a thing included in an observation image. The image classification unit 12, for example, may determine positions and shapes of a specific moving object included in observation images and classify observation images in such a way that observation images in which positions and shapes of moving objects are similar are classified into the same cluster. Alternatively, the image reception unit 11 may generate synchronization information, based on positions and shapes of a specific moving object included in observation images, and the image classification unit 12 may classify the observation images into clusters, based on the synchronization information, and generate multiple-images.

Note that the "specific moving object" is not specifically limited. The specific moving object is, for example, a cloud, an automobile, a bird, or an aircraft. However, the specific moving object is not limited to an artificial object and may be a natural thing such as a river.

A case in which the image classification unit 12 classifies observation images into a cluster of an observation image including a cloud and a cluster of an observation image not including a cloud will be described. It is assumed that, for example, in observation images in eight wavelength bands (N=8), second, third, fifth, and seventh observation images include a cloud and first, fourth, sixth, and eighth observation images do not include a cloud. In this case, the image classification unit 12 generates multiple-images including two clusters of a first cluster including the second, third, fifth, and seventh observation images including a cloud and a second cluster including the first, fourth, sixth, and eighth observation images not including a cloud.

In this manner, the image classification unit 12 classifies observation images into synchronized clusters and generates multiple-images. In other words, observation images included in a synchronized cluster include the same information as synchronization information. For example, when the image classification unit 12 executes classification by using an observation time, observation images included in each cluster have the same observation time. Note that the image classification unit 12 may use a plurality of pieces of synchronization information.

The wavelength interpolation unit 14 generates, based on an observation image (a first image) included in a certain cluster (a first cluster), an image (a third image) relating to an observation image (a second image) included in another cluster (a second cluster). More specifically, the wavelength interpolation unit 14 generates, based on a first image relating to a wavelength band (a first wavelength band) included in a first cluster having a specific relation with a wavelength band (a second wavelength band) of a second image included in a second cluster, a third image relating to the second wavelength band. In the following description, the third image may be referred to as an "interpolation image".

As described above, observation images relate to different wavelength bands. In other words, a third image is an image relating to a wavelength band different from a wavelength band of any observation image included in a first cluster. Further, the third image is an image relating to a wavelength band of any observation image included in a second cluster.

The wavelength interpolation unit 14 combines a generated image (a third image) with an observation image (a first image) of a first cluster that is a generation source, sets the combination as a new cluster, and generates multiple-images 130 (third multiple-images) including the new cluster.

In other words, the newly generated cluster includes, in addition to a wavelength band of an observation image included in the first cluster, an image (a third image) relating to a wavelength band of an observation image in the second cluster. In this manner, the wavelength interpolation unit 14 generates a cluster including an observation image relating to a wavelength band of a first cluster and a third image relating to a wavelength band of a second cluster, and generates the multiple-images 130 including the generated cluster.

Above-mentioned operation will be described in detail.

Hereinafter, while a case of two clusters is described, this is intended for convenience of description. The information processing device 1 may include three or more clusters. In such case, the information processing device 1 may select any two clusters and execute the following operation. Further, the information processing device 1 may execute the following operation with respect to combinations in all clusters.

A first cluster includes an observation image (a first image) not including a deficient area. A second cluster includes at least one observation image including a deficient area. A center wavelength of a wavelength band of an observation image including a deficient area is designated as a "wavelength $\lambda_j$".

The wavelength interpolation unit 14 generates a third image relating to a center wavelength $\lambda_j$ by using an observation image included in a first cluster.

Hereinafter, as an expression of pixel value of the x-th pixel of a horizontal direction and the y-th pixel of a vertical direction at a wavelength $\lambda$, "I(x, y, $\lambda$)" is used.

Specifically, the wavelength interpolation unit 14 uses a pixel value of an observation image included in a first cluster relating to wavelength bands having a predetermined relation with a center wavelength $\lambda_j$, and thereby calculates a pixel value (hereinafter designated as "$I_1(x, y, \lambda_j)$") at the center wavelength $\lambda_j$.

Here, wavelength bands having a predetermined relation refers to two wavelength bands closest to a center wavelength $\lambda_j$, in a first cluster. In other words, the wavelength interpolation unit 14 uses pixel values in observation images relating to two wavelength hands (hereinafter, center wavelengths thereof are respectively designated as $\lambda_{j0}$ and $\lambda_{j1}$ ($\lambda_{j0} < \lambda_{j1}$)) closest to a center wavelength $\lambda_j$, and thereby determines a pixel value relating to the center wavelength $\lambda_j$. Note that the wavelengths $\lambda_{j0}$ and $\lambda_{j1}$ are preferably wavelengths that sandwich a center wavelength $\lambda_j$ ($\lambda_{j0} < \lambda_j < \lambda_{j1}$). However, the present example embodiment is not limited thereto.

When wavelengths $\lambda_{j0}$ and $\lambda_{j1}$ are wavelengths that sandwich a center wavelength $\lambda_j$, the wavelength interpolation unit 14 calculates a pixel value at the center wavelength $\lambda_j$, by using equation 1 represented below.

$$I_1(x, y, \lambda_j) = (1 - \alpha)I_1(x, y, \lambda_{j0}) + \alpha I_1(x, y, \lambda_{j1}) \quad \text{[Equation 1]}$$

$$\alpha = \frac{\lambda_j - \lambda_{j0}}{\lambda_{j1} - \lambda_{j0}}$$

In equation 1, $I_1(x, y, \lambda_j)$ of the left side is a pixel value at a center wavelength $\lambda_j$ to be calculated. $I_1(x, y, \lambda_{j0})$ of a first term of the right side is a pixel value of an observation image relating to a wavelength $\lambda_{j0}$ in a first cluster. $I_1(x, y, \lambda_{j1})$ of a second term of the right side is a pixel value of an observation image relating to a wavelength $\lambda_{j1}$ in the first cluster.

In this manner, the wavelength interpolation unit 14 generates, based on pixel values of first images of wavelength bands having a predetermined relation with a second wavelength band included in a first cluster, a pixel value of a third image relating to the second wavelength band.

The wavelength interpolation unit 14 calculates all pixel values relating to a center wavelength $\lambda_j$. In this manner, the wavelength interpolation unit 14 generates, based on observation images included in a first cluster, a third image relating to a second wavelength band.

Then, the wavelength interpolation unit 14 generates a new cluster, based on the generated third image and the observation image of the first cluster. The wavelength interpolation unit 14 then generates the multiple-images 130, based on the new cluster.

In the multiple-images, observation images included in the same cluster are synchronized. In other words, the wavelength interpolation unit 14 generates a third image relating to a second wavelength band, based on the synchronized observation images. Therefore, the wavelength interpolation unit 14 is able to generate a third image having high association, i.e., an appropriate interpolation image.

The wavelength interpolation unit 14 may generate a third image for an observation image relating to one or a plurality of wavelength bands including a deficient area in a second cluster. However, the wavelength interpolation unit 14 may generate third images relating to wavelength bands of all observation images included in a second cluster. Hereinafter, description is made on the assumption that the wavelength interpolation unit 14 generates third images relating to all wavelength bands.

Further, the wavelength interpolation unit 14 may operate by switching the above described first image and second image. In other words, the wavelength interpolation unit 14 may generate, based on observation images of a second cluster, a third image relating to some or all of first wavelength bands, generate a new cluster, and generate the multiple-images 130 including the cluster. In the following description, description is made on the assumption that the wavelength interpolation unit 14 generates, also in a second cluster, images relating to all wavelength bands of a first cluster.

As described above, when the wavelength interpolation unit 14 generates, in all clusters, images relating to wavelength bands of observation images of another cluster, each cluster included in the multiple-images 130 includes images relating to the same wavelength bands in all the clusters. However, an image of each wavelength band included in each cluster is either a received observation image or a third image (an interpolation image) generated by the wavelength interpolation unit 14. In other words, each cluster does not include multiple-images for each wavelength band.

Note that equation 1 is one example of processing in the wavelength interpolation unit 14. The wavelength interpolation unit 14 may use an equation different from equation 1. The wavelength interpolation unit 14 may calculate the pixel value, for example, by using secondary interpolation, cubic interpolation, or spline interpolation.

Further, the number of wavelength bands used for calculation by the wavelength interpolation unit 14 is not limited to two. The wavelength interpolation unit 14 may use one wavelength band or may use more than two wavelength bands. When, for example, a second wavelength band for calculating a pixel value is higher than any of wavelength bands of observation images included in a first cluster, the wavelength interpolation unit 14 may calculate a pixel value by using an observation image relating to a highest wavelength band of the first cluster.

The image restoration unit 15 restores a deficient area by using an interpolation image generated by the wavelength interpolation unit 14, i.e., the multiple-images 130.

Specifically, the image restoration unit 15 compares, in the multiple-images 130, pixel values of clusters relating to a wavelength hand of an observation image including a deficient area. The image restoration unit 15 generates, based on the comparison result, an observation image in which the deficient area is restored, i.e., the restoration image 140, by using the pixel values of the clusters included in the multiple-images 130.

It is assumed that, for example, in a wavelength band in an observation image including a deficient area, a thing in which reflection of light is large is a covering object. In this case, the image restoration unit 15 compares, in images of each of clusters included in the multiple-images 130, pixel values in images (an observation image and an interpolation image) relating to a wavelength band of an observation image including a deficient area. The image restoration unit 15 makes a smallest pixel value as a pixel value in which an influence of the covering object is smallest. The image restoration unit 15, by referring to the pixel value in which the influence of the covering object is smallest, calculates a pixel value of a wavelength band that is a deficient area. For example, the image restoration unit 15 corrects a pixel value of an observation image including a deficient area in such a way as to be the same value or a close value as/to a pixel value in which an influence is smallest.

The image restoration unit 15 calculates pixel values by using similar processing with respect to pixels of a deficient area in all wavelength bands and generates the restoration image 140 by using the calculated pixel values.

Note that, when a thing in which reflection of light is small is a covering object, the image restoration unit 15 may make a largest pixel value as a value in which an influence of the covering object is smallest.

However, a technique used by the image restoration unit 15 is not limited to the above.

Two examples of techniques for calculating a pixel value in the image restoration unit 15 will be described below.

(1) First Technique

In a first technique, it is assumed that center wavelengths of wavelength bands of images included in each cluster of the multiple-images 130 are wavelengths $\lambda_1, \ldots, \lambda_N$. Further, it is assumed that the multiple-images 130 includes two clusters. It is assumed that a pixel value in an image relating to a wavelength $\lambda_n$ included in a first cluster is $I'_1(x, y, \lambda_n)$. Further, it is assumed that a pixel value in an image relating to a wavelength $\lambda_n$ included in a second cluster is $I'_2(x, y, \lambda_n)$.

Herein, the image restoration unit 15 calculates a pixel value $(I_3(x, y, \lambda_n))$ at a wavelength $\lambda_n$ in the restoration image 140, by using equation 2 using a predetermined coefficient n indicating an intensity of restoration.

at $I'_1(x,y,\lambda_n) < I'_2(x,y,\lambda_n)$ $I_3(x,y,\lambda_n) = r_1 \cdot I'_1(x,y,\lambda_n) + (1-r_1) \cdot I'_2(x,y,\lambda_n)$ at $I'_1(x,y,\lambda_n) \geq I'_2(x,y,\lambda_n)$ $I_3(x,y,\lambda n) = (1-r_1) \cdot I'_1(x,y,\lambda_n) + r_1 \cdot I'_2(x,y,\lambda_n)$ [Equation 2]

Note that the symbol "n" is a variable indicating a wavelength band and is any value from 1 to N.

(2) Second Technique

In a second technique, a variable of a pixel and a variable of a wavelength are similar to that of the first technique.

Herein, the image restoration unit 15 calculates a pixel value $(I_3(x, y, \lambda_n)$ in the restoration image 140, by using equation 3 using a predetermined coefficient $r_2$ indicating an intensity of restoration.

at $(\lambda_n \in \lambda_{n1}) \wedge (I'_1(x,y,\lambda_n) \geq I'_2(x,y,\lambda_n))$ $I_3(x,y,\lambda_n) = (1-r_2) \cdot I'_1(x,y,\lambda_n) + r_2 \cdot I'_2(x,y,\lambda_n)$ at $(\lambda_n \in \lambda_{n1}) \wedge (I'_1(x,y,\lambda_n) < I'_2(x,y,\lambda_n))$ $I_3(x,y,\lambda_n) = I'_1(x,y,\lambda_n)$ at $(\lambda_n \in \lambda_{n2}) \wedge (I'_1(x,y,\lambda_n) \geq I'_2(x,y,\lambda_n))$ $I_3(x,y,\lambda_{n1}) = I'_2(x,y,\lambda_{n1})$ at $(\lambda_n \in \lambda_{n2}) \wedge (I'_1(x,y,\lambda_n) < I'_2(x,y,\lambda_n))$ $I_3(x,y,\lambda_{n1}) = r_2 \cdot I'_1(x,y,\lambda_n) + (1-r_2) \cdot I'_2(x,y,\lambda_n)$ [Equation 3]

Note that the symbol "n" is, similarly to the above, a variable indicating a wavelength band and is any integer from 1 to N. The symbol "$n_1$" is a variable indicating a wavelength band of an observation image of a first cluster and is any integer of 1 to $N_1$ ($N_1$ is the number of observation images included in the first cluster). The symbol "$\lambda_{n1}$" is a set of center wavelengths of wavelength bands of observation images included in the first cluster. The symbol "$n_2$" is a variable indicating a wavelength band of an observation image of a second cluster and is any integer of 1 to $N_2$ ($N_2$ is the number of observation images included in the second cluster), The symbol "$\lambda_{n2}$" is a set of center wavelengths of wavelength bands of observation images included in the second cluster. However, it is assumed that a center wavelength ($\lambda_{n1}$) of a wavelength band of an observation image included in the first cluster is different from a center wavelength ($\lambda_{n2}$) of a wavelength band of an observation image included in the second cluster.

The image restoration unit 15 may operate in relation to a specific wavelength band.

For example, the image restoration unit 15 may assume a case in which, in a specific wavelength band, a thing having a feature in reflection or absorption of light is a covering object. In this case, the image restoration unit 15, for example, compares pixel values in a specific wavelength band, and makes an observation image in which a pixel value in the wavelength band is largest (or smallest) as an observation image in which an influence of the covering object in the pixel is smallest. The image restoration unit 15 may calculate a pixel value of the restoration image 140, based on the pixel value in the wavelength band of the observation image, and generate the restoration image 140.

Description of Operation

Next, an operation of the information processing device 1 according to the first example embodiment is described with reference to the drawings.

Figure 3:
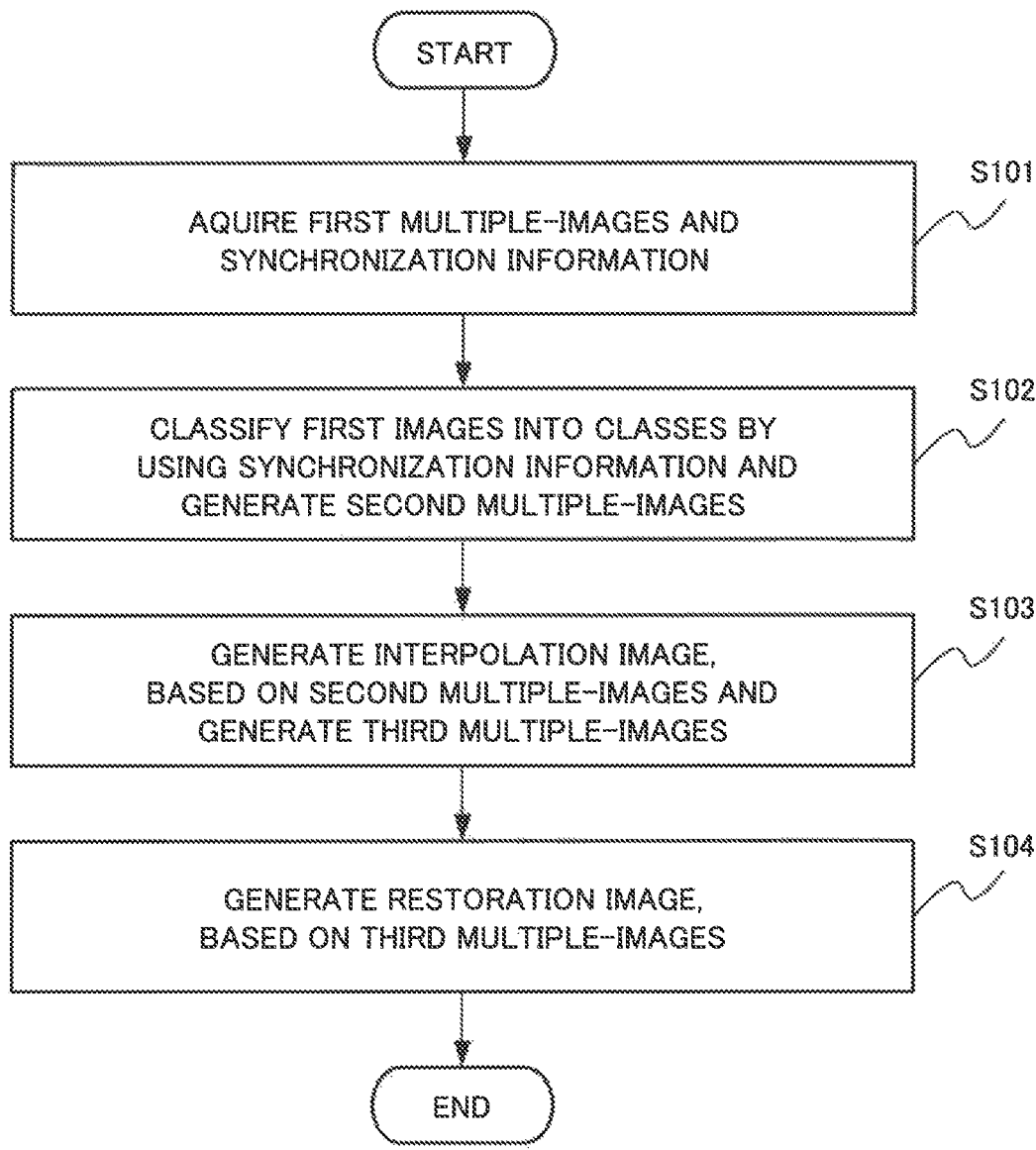
FIG. 3 is a flowchart illustrating one example of an operation of the information processing device according to the first example embodiment.

FIG. 3 is a flowchart illustrating one example of an operation of the information processing device 1 according to the first example embodiment.

The image reception unit 11 acquires the multiple-observation-images 110 (first multiple-images) including an observation image and synchronization information (step S101). The image reception unit 11 may receive, for example, the multiple-observation-images 110 from a device (e.g. the image supply device 8) which captures an observation image. Alternatively, the image reception unit 11 may read the multiple-observation-images 110 from a storage device that is not illustrated. Further, the image reception unit 11 may receive synchronization information from a device (e.g. the image supply device 8) which captures an observation image. Alternatively, the image reception unit 11 may generate synchronization information.

The image classification unit 12 classifies observation images into clusters in such a way that synchronized observation images are included in the same cluster by using synchronization information, and generates multiple-images (second multiple-images) (step S102). Note that the image classification unit 12 may generate synchronization information.

The wavelength interpolation unit 14 generates, based on an observation image (a first image) included in a first cluster, an image (a third image, an interpolation image) relating to a wavelength band of an observation image (a second image) included in a second cluster. Then, the wavelength interpolation unit 14 generates a new cluster from the generated third image and a cluster including the first image, and generates the multiple-images 130 (third multiple-images), based on the new cluster. In other words, the wavelength interpolation unit 14 generates an image relating to a wavelength band of another cluster, and generates the multiple-images 130 (third multiple-images). In other words, the wavelength interpolation unit 14 generates an interpolation image based on multiple-images, and generates the multiple-images 130 based on the multiple-images and the interpolation image (step S103).

Note that the wavelength interpolation unit 14 may not generate, as a new cluster, a logical block (e.g. a file) including the generated third image and an observation image of a first cluster. For example, the wavelength interpolation unit 14 may store, as information of the multiple-images 130 (third multiple-images), management information that associates the generated third image with an observation image of a first cluster. In this case, the image restoration unit 15 may operate based on the management information.

The image restoration unit 15 calculates a pixel value of the restoration image 140, based on a pixel value of each wavelength band in the multiple-images 130, and generates the restoration image 140, based on the calculated pixel value (step S104). The restoration image 140 is an image in which a deficient area is restored.

Description of Advantageous Effect

Next, an advantageous effect of the information processing device 1 according to the first example embodiment will be described.

The information processing device 1 according to the first example embodiment has an advantageous effect of generating an image for restoring an observation image without using the reference image 720.

The reason is as follows.

The image reception unit 11 receives the multiple-observation-images 110 including observation images. The observation image is associated with a wavelength band.

The image classification unit 12 classifies, by using synchronization information, the observation images of the multiple-observation-images 110 into the multiple-images in such a way that synchronized observation images are included in the same cluster.

The wavelength interpolation unit 14 generates, in each cluster included in multiple-images, an image (an interpolation image) relating to a wavelength band of another cluster. Then, the wavelength interpolation unit 14 generates a cluster including the generated image and the original image, and generates the multiple-images 130 including the generated cluster.

The interpolation image is an image used for generating the restoration image 140 by the image restoration unit 15 described below. In other words, the interpolation image is an image for restoring a deficient area in an observation image.

In this manner, the information processing device 1 is able to generate an image (an interpolation image) for restoring an observation image, without using the reference image 720.

The image restoration unit 15 synthesizes pixel values of the restoration image 140, based on pixel values in wavelength bands in the multiple-images 130, and generates the restoration image 140.

In this manner, the information processing device 1 is able to generate the restoration image 140, based on an observation image.

For repetition, the information processing device 1 has the following advantageous effect.

The image reception unit 11 associates an observation image with a wavelength band. Therefore, the information processing device 1 is able to achieve restoration associated with a predetermined wavelength band.

Further, the image classification unit 12 classifies synchronized observation images into the multiple-images in such a way as to be included in the same cluster. Therefore, the information processing device 1 is able to achieve restoration, based on synchronized images.

Further, the wavelength interpolation unit 14 generates, in each cluster, an image of a wavelength band, based on an image having a predetermined relation with a wavelength band of an image to be restored. Therefore, the image processing device 1 is able to generate an image (an interpolation image) used for restoration relating to each wavelength band.

Further, the image restoration unit 15 generates the restoration image 140, based on an interpolation image generated by the wavelength interpolation unit 14 and an observation image. In this manner, the information processing device 1 is able to generate the restoration image 140 in which a deficient area of an observation image is restored, without using the reference image 720.

Modified Example

As already described, in the information processing device 1, the number of observation images used for restoration is not limited. For example, the information processing device 1 may operate by using two observation images, i.e., an observation image not including a deficient area and an observation image including a deficient area. In this case, the information processing device 1 may not include the image classification unit 12.

Further, the information processing device 1 may replace, as the restoration image 140, an image generated by the wavelength interpolation unit 14 with a deficient area. Alternatively, the information processing device 1 may transmit the multiple-images 130 (third multiple-images including an interpolation image) to another device that executes restoration of the restoration image 140. In this case, the information processing device 1 may not include the image restoration unit 15.

Figure 4:
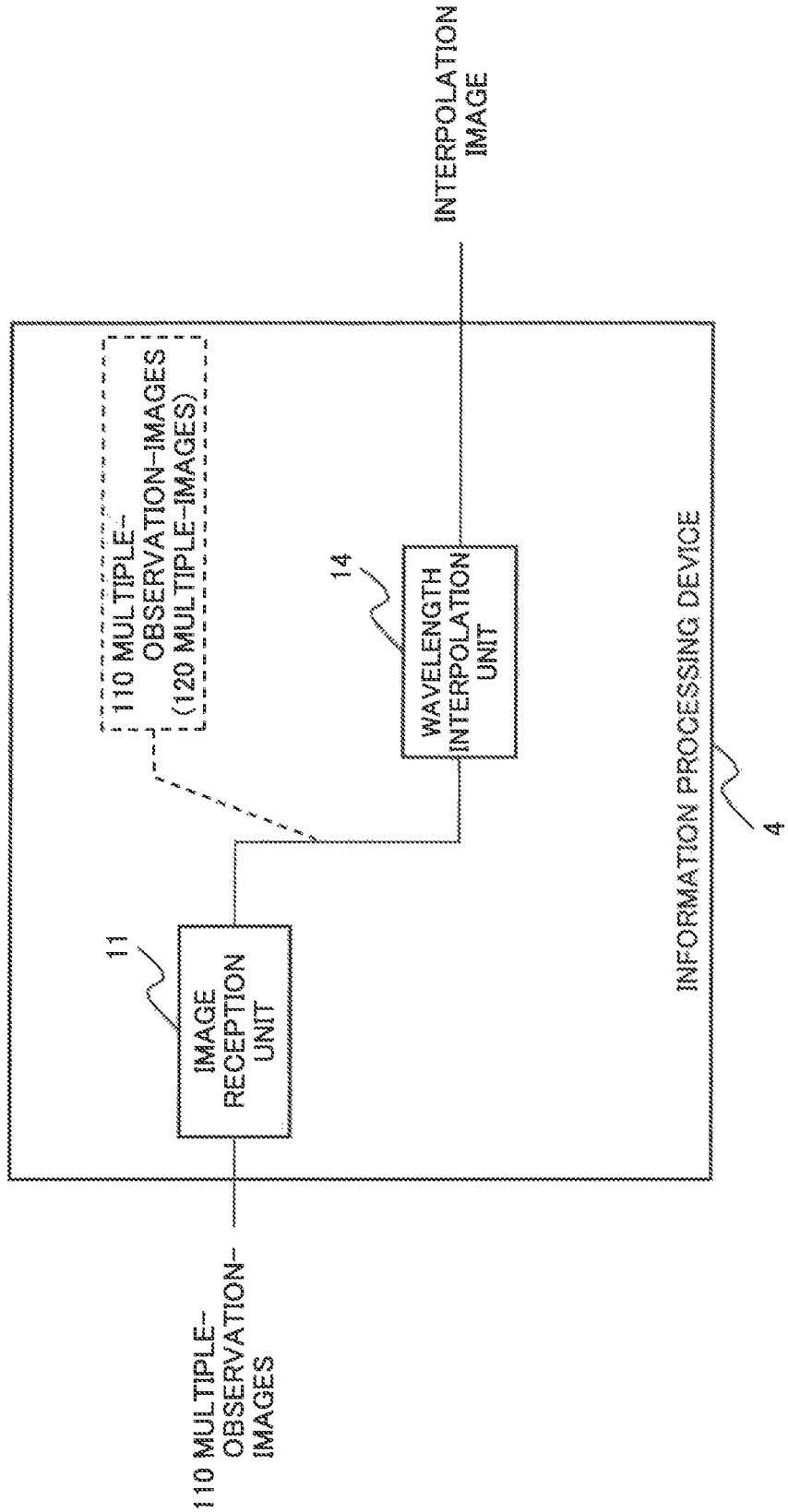
FIG. 4 is a block diagram illustrating one example of a configuration of a modified example of the information processing device according to the first example embodiment.

FIG. 4 is a block diagram illustrating one example of a configuration of an information processing device 4 that is a modified example of such case. The information processing device 4 includes the image reception unit 11 and the wavelength interpolation unit 14.

The image reception unit 11 receives the multiple-observation-images 110 (first multiple-images). The multiple-observation-images 110 includes, for example, an observation image (a first image) relating to a first wavelength band and an observation image (a second image) relating to a second wavelength band. In other words, an observation image is associated with a wavelength band.

The wavelength interpolation unit 14 generates, based on a first image, an image (a third image) relating to a second image in a second wavelength band different from a first wavelength band of the first image.

The information processing device 4 configured in this manner has an advantageous effect similar to the advantageous effect of the information processing device 1.

The reason is that, components of the information processing device 4 are able to generate an image to be restored based on the operation, similarly to the information processing device 1.

Note that the information processing device 4 is a minimum configuration of example embodiments of the present invention.

Second Example Embodiment

Next, an information processing device 2 according to a second example embodiment is described with reference to the drawings.

Figure 5:
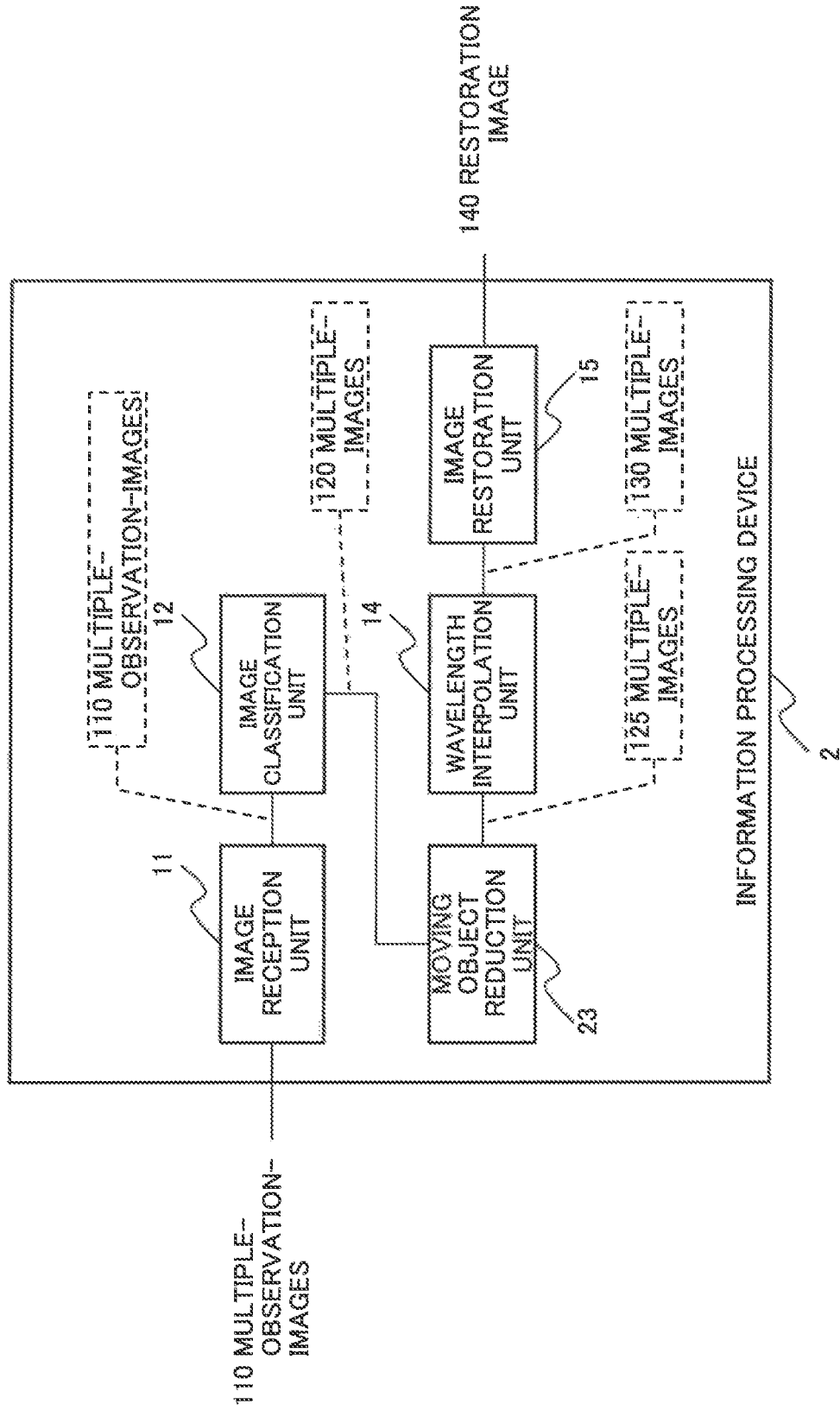
FIG. 5 is a block diagram illustrating one example of a configuration of an information processing device according to a second example embodiment.

FIG. 5 is a block diagram illustrating one example of a configuration of the information processing device 2 according to the second example embodiment. The information processing device 2 includes a moving object reduction unit 23, in addition to the configuration of the information processing device 1. Therefore, in the following description, description of a component and an operation similar to the first example embodiment is omitted, and a component and an operation characteristic of the second example embodiment are described.

Note that the moving object reduction unit 23 achieves an operation to be described later, by using an electronic circuit or a processor that operates based on a program, similarly to the image classification unit 12 and the wavelength interpolation unit 14.

The moving object reduction unit 23 generates multiple-images 125 in which an influence due to a moving object (e.g. a cloud) is reduced, with respect to multiple-images 120 generated by the image classification unit 12. However, it is unnecessary for the moving object reduction unit 23 to operate for all observation images included in the multiple-images 120. The moving object reduction unit 23 may reduce an influence of a moving object in some observation images.

Note that the multiple-images 120 includes observation images included in the multiple-observation-images 110. In other words, the moving object reduction unit 23 reduces an influence due to a moving object included in an observation image (a first image) not including a deficiency and/or an observation image (a second image) including a deficiency.

The wavelength interpolation unit 14 generates the multiple-images 130 by using the multiple-images 125 in which an influence of a moving object is reduced.

One example of details of an operation in the moving object reduction unit 23 is described.

The moving object reduction unit 23 divides the multiple-images 120 into image areas having a predetermined size. Herein, it is assumed that the moving object reduction unit 23 regards, in each area, a smallest pixel value as an influence due to a moving object (e.g. a cloud). Therefore, the moving object reduction unit 23 subtracts the smallest pixel value from all pixel values of the area. The moving object reduction unit 23 reduces an influence of a moving object, based on such an operation.

The wavelength interpolation unit 14 generates the multiple-images 130 by using the multiple-images 125 in which an influence of a moving object is reduced. Therefore, the wavelength interpolation unit 14 more appropriately generates the multiple-images 130 than that in the first example embodiment.

Description of Advantageous Effect

The information processing device 2 according to the second example embodiment has an advantageous effect of reducing an influence of a moving object in an observation image, in addition to the advantageous effect of the first example embodiment.

The reason is that the moving object reduction unit 23 reduces an influence due to a moving object.

Hardware Configuration Example

Each constituent unit included in the each example embodiment described above, i.e. the information processing device 1 according to the first example embodiment illustrated in FIG. 1, the information processing device 4 according to the modified example illustrated in FIG. 4, and the information processing device 2 according to the second example embodiment illustrated in FIG. 5, may be achieved as follows.

Each constituent unit may be achieved by using dedicated hardware (HW, e.g. an electronic circuit). Alternatively, each constituent unit may be achieved as a function of a program that operates on a processor. Alternatively, each constituent unit may be achieved by using a combination of the above.

Further, the division of the constituent units illustrated in FIGS. 1, 4, and 5 is a division for convenience of description. Each constituent unit may be subjected to various modifications upon implement thereof.

A hardware configuration according to the each example embodiment of the present invention will be described with reference to the drawings.

Figure 6:
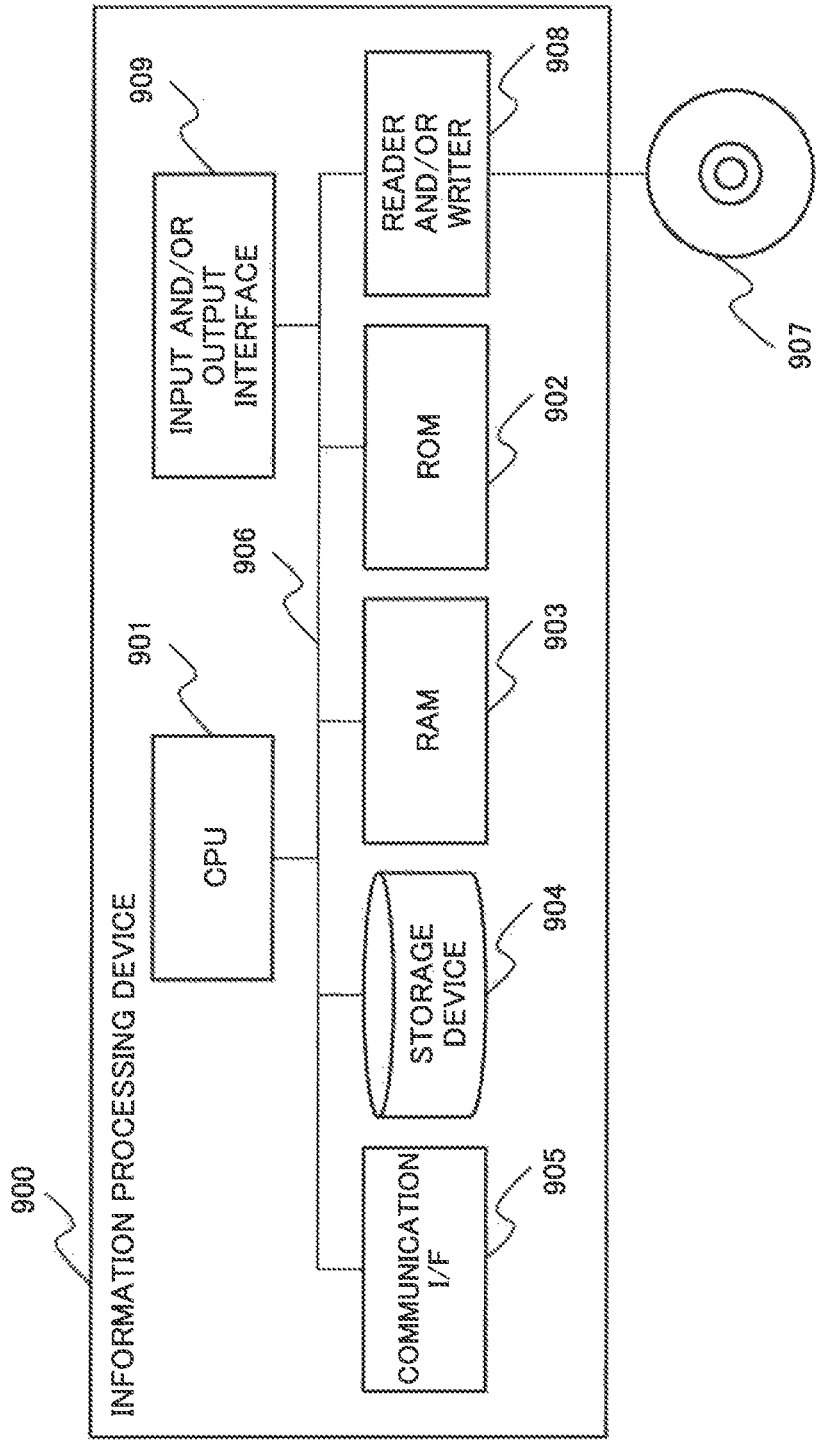
FIG. 6 is a block diagram illustrating one example of a configuration of hardware of an information processing device according to each example embodiments.
Figure 7:
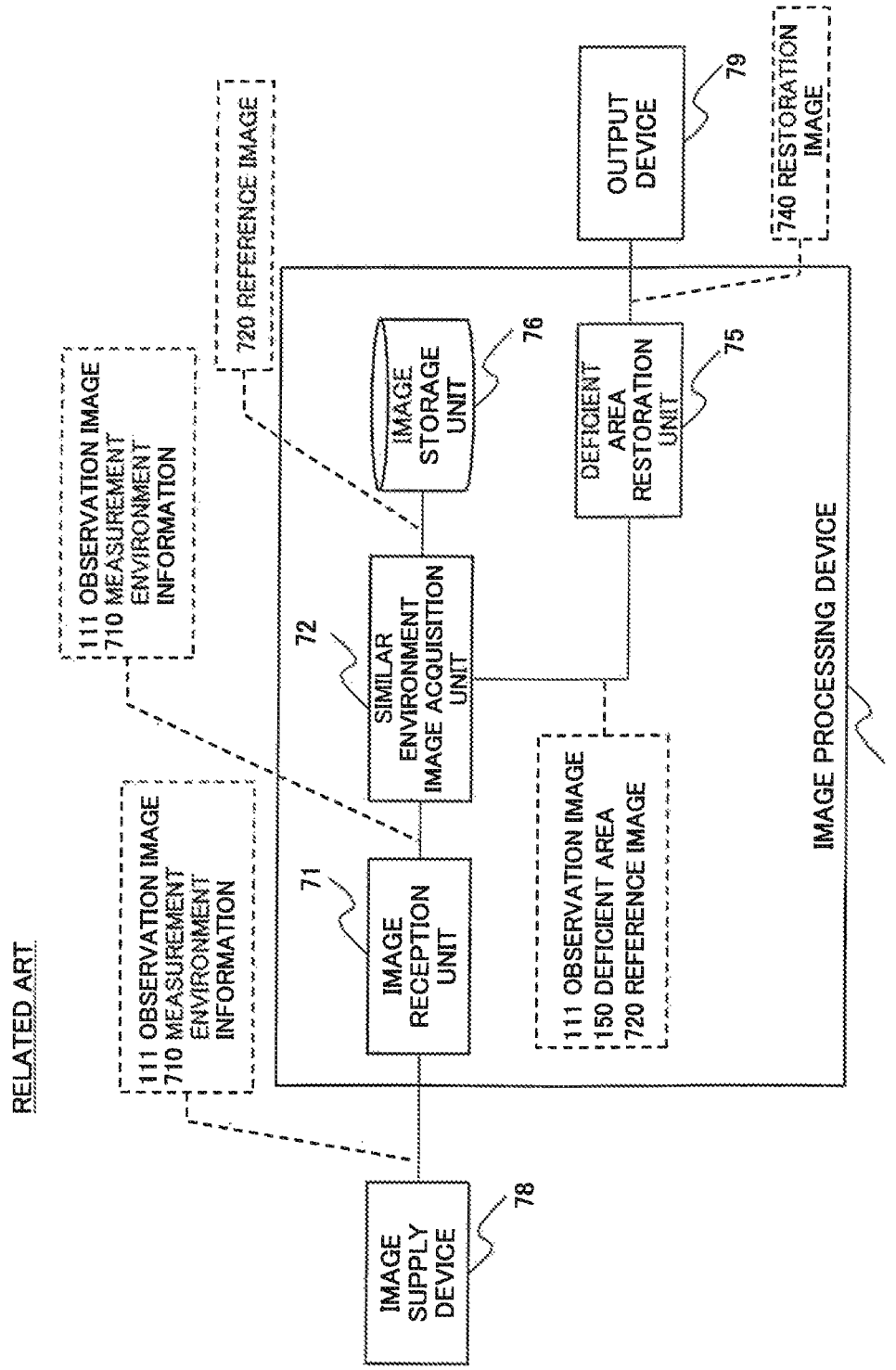
FIG. 7 is a block diagram schematically illustrating a configuration of functions of an image processing device described in PTL 1.

FIG. 6 is a block diagram illustrating one example of a configuration of an information processing device 900 according to the each example embodiment of the present invention.

In other words, the information processing device 900 illustrated in FIG. 6 is one example of a hardware configuration of the information processing device 1 illustrated in FIG. 1, the information processing device 4 illustrated in FIG. 4, and the information processing device 2 illustrated in FIG. 5.

The information processing device 900 illustrated in FIG. 6 includes the following elements except a recording medium 907.

(1) Central Processing Unit (CPU) 901

The CPU 901 achieves a function as the information processing device 900 according to the each example embodiment, based on a program. The CPU 901 is a general-purpose or dedicated computer chip and a peripheral circuit.

(2) Read Only Memory (ROM) 902

The Rom 902 non-transitorily stores a program executed by the CPU 901 and data. The ROM 902 is, for example, a programmable-ROM (P-ROM) or a flash ROM.

(3) Random Access Memory (RAM) 903

The RAM 903 transitorily stores a program executed by the CPU 901 and data. The RAM 903 is, for example, a dynamic-RAM (D-RAM).

(4) Storage Device 904

The storage device 904 non-transitorily stores data and a program stored by the information processing device 900 in a long term. Further, the storage device 904 may operate as a temporary storage device for the CPU 901. The storage device 904 is, for example, a hard disk device, a magneto-optical disk device, or an SSD.

(5) Communication Interface (I/F) 905

The communication I/F 905 mediates communication with an external device that is not illustrated. The communication I/F 905 is, for example, a local area network (LAN) card. Further, the communication I/F 905 is not limited to a wired basis and may be a wireless basis. The communication I/F 905 may operate as a part of the image reception unit 11 and/or the image restoration unit 15.

(6) Recording Medium 907

The recording medium 907 computer-readably records a program and/or data. The recording medium 907 may non-transitorily record a program and/or data. The recording medium 907 is, for example, a compact disc (CD)-ROM, a CD-recordable (CD-R), or a digital versatile disc (DVD)-ROM.

(7) Reader and/or Writer 908

The reader and/or writer 908 reads a program and/or data stored on the recording medium 907, and/or writes data. The reader and/or writer 908 is, for example, a CD drive, a CD-R writer, or a DVD reader.

(8) Input and/or Output Interface 909

The input and/or output interface 909 accepts input of data for the information processing device 900 and/or outputs data from the information processing device 900. The input and/or output interface 909 may operate as a part of the image reception unit 11 and/or the image restoration unit 15. The input and/or output interface 909 is, for example, a universal serial bus (USB) card.

(9) Bus 906

The bus 906 connects each of elements of the information processing device 900. The bus 906 is, for example, a peripheral component interconnect (PCI) bus.

The information processing device 900 achieves the each example embodiment by using the configuration described above.

In other words, the each example embodiment supplies a computer program capable of achieving a function described below to the information processing device 900.

Such function includes the image reception unit 11, the image classification unit 12, the moving object reduction unit 23, the wavelength interpolation unit 14, and the image restoration unit 15 in the block diagrams (FIGS. 1, 4, and 5) referred to in the description of the each example embodiment. Alternatively, the function is a function illustrated in the flowchart (FIG. 3) referred to in the description of the example embodiment.

The information processing device 900 achieves the above-mentioned function, based on reading, interpretation, and execution of a program by the CPU 901 that is hardware.

Note that a supplied program is stored on the RAM 903 that is a readable, writable, and transitory memory or on the storage device 904 that is a non-transitory storage device.

A supply method of a program is not specifically limited. A program may be supplied via a general technique. For example, a program may be installed by using the recording medium 907 or may be downloaded via the communication I/F 905. In this case, it can be said that the each example embodiment of the present invention is configured by using a code configuring a program or the recording medium 907 that stores such code.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016145056, filed on Jul. 25, 2016, the disclosure of which is incorporated herein in its entirety by reference.

INDUSTRIAL APPLICABILITY

The present invention is applicable to generation of a map, grasp of a land use state, grasp of situation of eruption of a volcano and a forest fire, acquisition of a growth situation of an agricultural crop, and identification of a mineral based on a result acquired by observing an earth's surface from a high altitude.

REFERENCE SIGNS LIST

1 Information processing device
2 Information processing device
3 Information processing system,
4 Information processing device
7 Image processing device
8 Image supply device
9 Output device
11 Image reception unit
12 Image classification unit
14 Wavelength interpolation unit
15 Image restoration unit
23 Moving object reduction unit
71 Image reception unit
72 Similar environment image acquisition unit
76 Image storage unit
75 Deficient area restoration unit
78 Image supply device
79 Output device
110 Multiple-observation-images
111 Observation image
120 Multiple-images
125 Multiple-images
130 Multiple-images
140 Restoration image
150 Deficient area
710 Measurement environment information
720 Reference image
740 Restoration image
900 Information processing device
901 CPU
902 ROM
903 RAM
904 Storage device
905 Communication I/F
906 Bus
907 Recording medium
908 Reader and/or writer
909 Input and/or output interface

The invention claimed is:

1. An information processing device comprising:
a memory; and
at least one processor coupled to the memory,
the at least one processor performing operations, the operations comprising:
receiving a plurality of images having different wavelength bands that relate to each other;
classifying the received images into at least two clusters such that the received images that are synchronized are included in the same cluster, the at least two clusters including a first cluster and a second cluster, the first cluster including at least one first image that does not include a deficient area and not including a second image that includes at least one deficient area, and the second cluster including the second image;
generating a third image that has a wavelength band relating to a wavelength band of the second image included in the second cluster, based on the at least one first image that is included in the first cluster, and has a wavelength band related to the wavelength band of the second image, wherein the operations further comprising: generating a pixel value of the third image, based on pixel values of at least two of the first images that have wavelength bands that sandwich the wavelength band of the second image; and
restoring the at least one deficient area in the second image by using the third image.

2. The information processing device according to claim 1, wherein the operations further comprising:
reducing an influence due to a moving object included in at least one of the at least one first image or the second image.

3. An information processing method for an information processing device, the method comprising:
receiving a plurality of images having different wavelength bands that relate to each other;
classifying the received images into at least two clusters such that the received images that are synchronized are included in the same cluster, the at least two clusters including a first cluster and a second cluster, the first cluster including at least one first image that does not include a deficient area and not including a second image that includes at least one deficient area, and the second cluster including the second image;
generating a third image that has a wavelength band relating to a wavelength band of the second image included in the second cluster, based on the at least one first image that is included in the first cluster, and has a wavelength band related to the wavelength band of the second image, wherein the method further comprising: generating a pixel value of the third image, based on pixel values of at least two of the first images that have wavelength bands that sandwich the wavelength band of the second image; and
restoring the at least one deficient area in the second image by using the third image.

4. A non-transitory computer-readable recording medium embodying a program, the program causing a computer to perform a method, the method comprising:
receiving a plurality of images having different wavelength bands that relate to each other;
classifying the received images into at least two clusters such that the received images that are synchronized are included in the same cluster, the at least two clusters including a first cluster and a second cluster, the first cluster including at least one first image that does not include a deficient area and not including a second image that includes at least one deficient area, and the second cluster including the second image;
generating a third image that has a wavelength band relating to a wavelength band of the second image included in the second cluster, based on the at least one first image that is included in the first cluster, and has a wavelength band related to the wavelength band of the second image, wherein the method further comprising: generating a pixel value of the third image, based on pixel values of at least two of the first images that have wavelength bands that sandwich the wavelength band of the second image; and restoring the at least one deficient area in the second image by using the third image.

* * * * *